(12) United States Patent
Bokish

(10) Patent No.: US 7,254,407 B1
(45) Date of Patent: Aug. 7, 2007

(54) EFFICIENT DELIVERY OF INFORMATION SERVICES INFORMATION

(75) Inventor: Bruce Bokish, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 278 days.

(21) Appl. No.: 10/659,171

(22) Filed: Sep. 9, 2003

(51) Int. Cl.
 *H04Q 7/20* (2006.01)
(52) U.S. Cl. ................. 455/456.3; 455/456.2; 705/14
(58) Field of Classification Search ............. 455/456.3, 455/456.2, 414.1
 See application file for complete search history.

(56) References Cited

U.S. PATENT DOCUMENTS

| | | | | |
|---|---|---|---|---|
| 6,816,727 | B2 * | 11/2004 | Cox et al. ................. | 455/414.1 |
| 2002/0138347 | A1 * | 9/2002 | Sakata ........................ | 705/14 |
| 2003/0096614 | A1 * | 5/2003 | Paila ........................... | 455/450 |
| 2004/0190707 | A1 * | 9/2004 | Ljubicich ................ | 379/218.01 |
| 2004/0198329 | A1 * | 10/2004 | Vasa ........................ | 455/414.1 |

* cited by examiner

*Primary Examiner*—Creighton Smith
(74) *Attorney, Agent, or Firm*—Withrow & Terranova, PLLC

(57) ABSTRACT

The present invention provides an information services system and method for providing information services, wherein a pointer is provided in response to a request for information from the user. The pointer provides an addressable location at which the requested information may be accessed by the telephony terminal from which the information request was generated. The information may be accessed through a traditional browser or downloaded using a file transfer application. Since a pointer instead of the actual information is provided in response to the information request, limited-capacity messaging techniques can be used to transmit the pointer to the telephony terminal. Based on the capabilities of the applications running on the telephony terminal, the requested information may include any combination of text, graphics, audio, video, pictures, and the like, wherein the relative size of the information requested is only limited by the capabilities of those applications and of the communication medium.

30 Claims, 4 Drawing Sheets

EFFICIENT DELIVERY OF INFORMATION SERVICES INFORMATION

FIELD OF THE INVENTION

The present invention relates to providing information services, and in particular to providing a pointer in response to an information request, wherein the pointer identifies a location of information responsive to the information request.

BACKGROUND OF THE INVENTION

Traditional directory assistance has evolved into enhanced information services, wherein a user can request everything from directory numbers and addresses to movie listings and driving directions. The user will initiate a call to the information services system, make a request, and the requested information is audibly delivered to the user via a telephone terminal. There has always been a challenge associated with remembering or otherwise keeping track of directory assistance information. The additional information available from enhanced information services only exacerbates the problem. Users either try to remember the information or make written notes of the information. In general, the users only remember the information temporarily, and notes are often lost or discarded, especially when the requests for information are made from mobile terminals when the user is on the move.

In an attempt to reduce the relatively temporary nature of the requested information, certain cellular technology allows the information services providers to send basic text messages including the requested information to the user's telephony terminal in addition to the traditional voice delivery. The most prevalent technique for delivering such messages incorporates the requested information in a short messaging service (SMS) message, which is delivered to the mobile terminal using SMS. The ability to receive the requested information in electronic form has proven beneficial. Unfortunately, like the name of the short messaging service implies, the service provides limited capacity for delivering the requested information. For example, most SMS messages are limited to 120 text characters. The limited SMS messages are sufficient to transmit directory numbers and basic addresses for a requested listing, but cannot effectively deliver the amount of information available in response to requests for enhanced information services information, such as movie listings and driving directions. In addition, the information transmitted in the SMS messages is limited to text, and is incapable of carrying information in other formats, such as audio, video, pictures, or graphics. Further, the SMS interface provides limitations on how the received information can be used and stored in applications running on the mobile terminal.

Accordingly, there is a need for a more efficient and effective way to provide information to a telephony terminal in response to an information services request. There is a further need to be able to provide the information in a variety of formats other than text, as well as allow other applications running on the telephony terminal to store or make ready use of the requested information.

SUMMARY OF THE INVENTION

The present invention provides an information services system and method for providing information services, wherein a pointer is provided in response to a request for information from a user. The pointer provides an addressable location at which the requested information may be accessed by the user's telephony terminal, from which the information request was generated. The information may be accessed through a traditional browser or downloaded using a file transfer application. Since a pointer instead of the actual information is provided in response to the information request, limited-capacity messaging techniques can be used to transmit the pointer to the telephony terminal. Based on the capabilities of the applications running on the telephony terminal, the requested information may include any combination of text, graphics, audio, video, pictures, and the like, wherein the relative size of the requested information is only limited by the capabilities of those applications and the data access capabilities of the communication medium.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention operates to provide a pointer to information in response to an information request by a user from a telephony terminal. When a user calls into an information services system and makes a request for information, the information services system either creates and stores the information or locates the information, wherein the pointer is sufficient to allow the telephony terminal to access or download the information. Instead of attempting to send the requested information directly to the telephony terminal in an electronic format, the telephony terminal can access the requested information using the pointer through an application capable of receiving files of virtually any size and format, including audio, video, graphics, text, and the like. The delivery of the pointer may by in addition to or instead of traditional voice delivery of the requested information.

Figure 1:
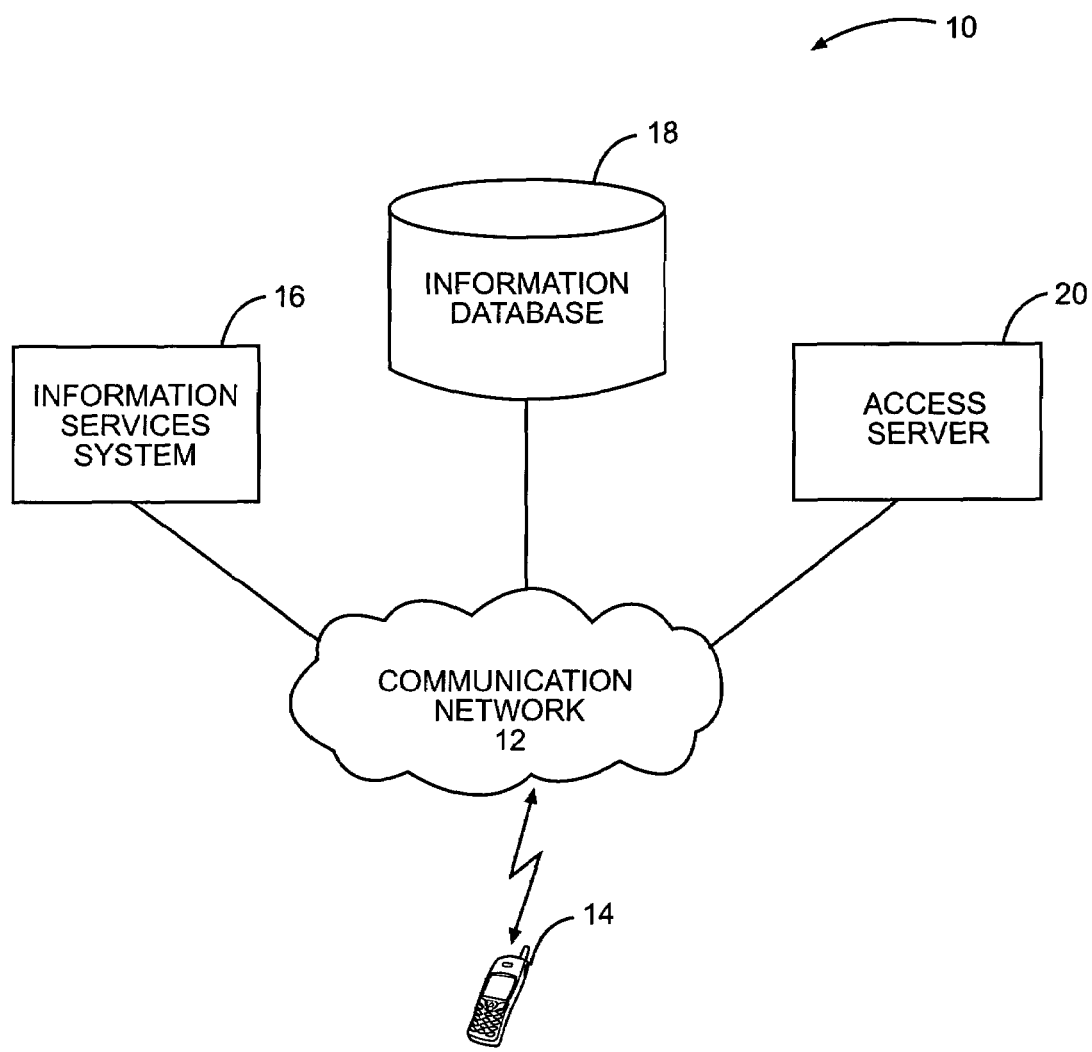
FIG. 1 is a block representation of a communication environment according to one embodiment of the present invention.

Turning now to FIG. 1, an exemplary communication environment 10 is shown centered about a communication network 12, which facilitates information requests from a telephony terminal 14 to an information services system 16, such as an enhanced operator or information service system, customer service system, or the like. An information database 18 may be accessible by the information services system 16 to assist in the location of requested information or the creation thereof based on the information request provided by the user of the telephony terminal 14. Whether located or dynamically created in response to the request, the requested information may already reside on or may be stored on an access server 20, which is directly or indirectly associated with the information services system 16. The requested information is associated with a pointer, which is an address, hyperlink, uniform (or universal) resource locator (URL), domain, or the like, pointing to a location where the requested information is stored and can be accessed by the telephony terminal 14 using the pointer.

The information services system 16 is adapted to terminate incoming calls through which requests for information are made. Depending on the particular environment, the calls may be packet-based (e.g. voice-over-IP), wireline (e.g. Public Switched Telephone Network), or wireless (e.g. cellular or wireless local area network). The present invention is particularly beneficial in wireless environments, where there is limited capacity for sending data to the telephony terminal 14 in association with a call with the information services system 16. One method for sending such data uses the short messaging service (SMS), wherein text-based information of 120 characters or less may be transmitted to the telephony terminal 14. With the present invention, the pointer may be sent to the telephony terminal 14 via an SMS message. Once the pointer is received, the telephony terminal 14 can use the pointer to access information at or download information from a location on the access server 20 associated with the pointer. The requested information may be accessed via a browser application running on the telephony terminal 14. Alternatively, a file transfer application or appropriately configured browser may be used to download the information to the telephony terminal 14 for storing and subsequent access.

The user of browsing or other downloading and viewing applications running on the telephony terminal 14 significantly expands on the amount of information that can be received from the information services system 16, as well as the number of format types in which the information may be received. Instead of receiving simple text-based information, virtually any type of data can be received in any media format, including audio, video, graphics, pictures, or text. Accordingly, mark-up language based web pages of text and graphics, video clips, audio files, pictures, and the like, are all readily available to the user via the telephony terminal 14 in response to a standard request for information. For example, a user may request a particular song and receive a pointer to a location on the access server 20 at which an mp3 file for the particular song is stored. Those skilled in the art will recognize that the present invention can be used for the purchase and distribution of music or other creative media. Alternatively, if the user requests driving directions, the pointer returned in response to the request may point to a location on the access server 20 storing detailed driving directions and an associated map outlining the desired route. As another example, movie listings including show times, video clips, and related advertising may be provided at the location on the access server 20 associated with the pointer.

Figure 2:
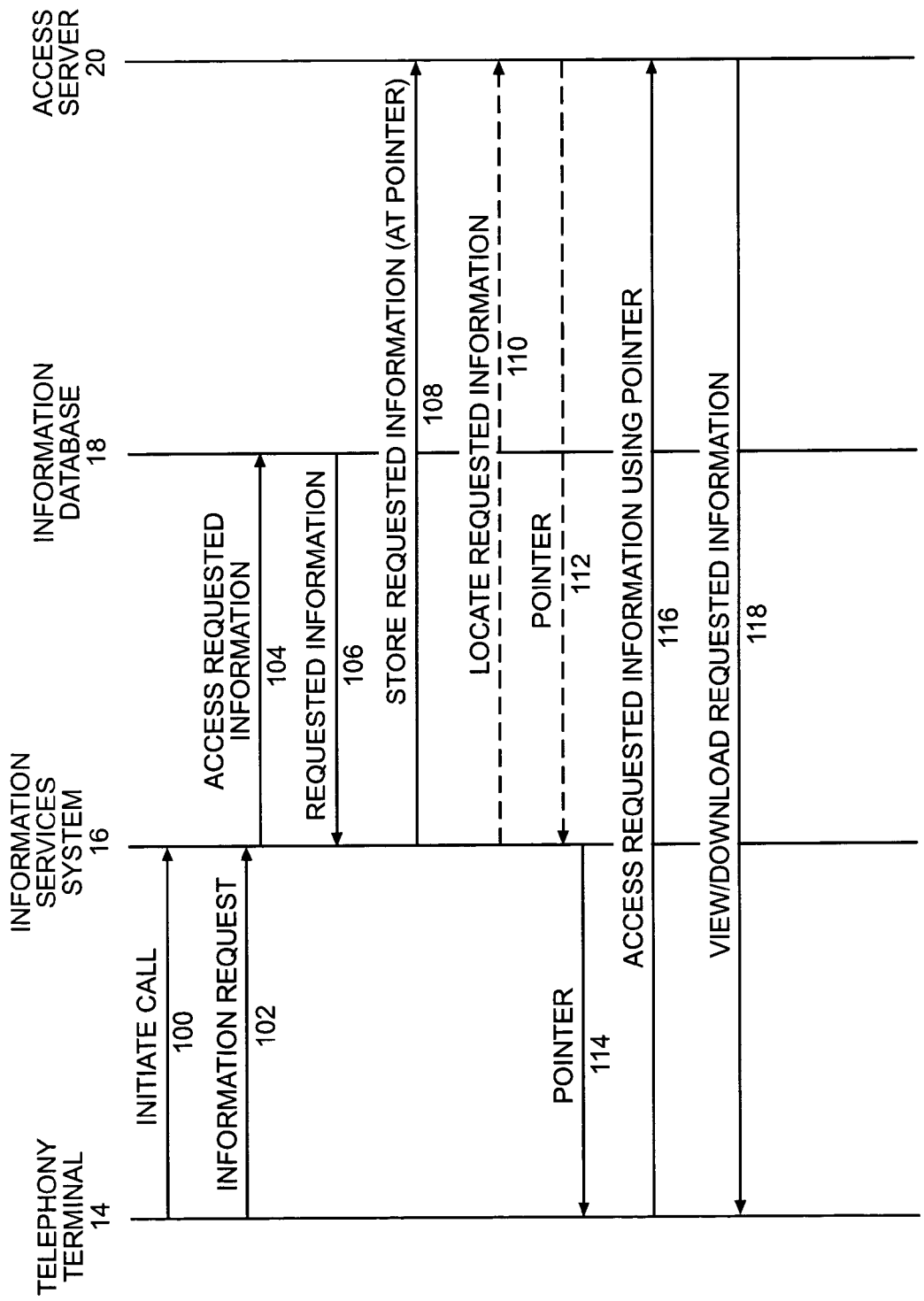
FIG. 2 is a communication flow diagram outlining the operation of the present invention according to one embodiment.

With reference to FIG. 2, an exemplary information request scenario is outlined. Initially, a call is initiated by the user from the telephony terminal 14 to the information services system 16 (step 100). The user will audibly or through a user interface request information from the information services system 16 (step 102). The information services system 16 will then access the requested information through human assistance or in an automated fashion, such as via the information database 18 (step 104). Upon receipt of the requested information from the information database 18 (step 106), the information services system 16 will store the requested information at a particular location on the access server, which is associated with a pointer (step 108). Alternatively, the information services system 16 may simply locate the requested information on the access server 20 (step 110) and receive a pointer to the location where in requested information is stored (step 112). In either case, the information services system 16 will effect delivery of the pointer to the telephony terminal 14 (step 114), via a messaging service such as SMS, instant messaging, email, wireless access protocol (WAP), or any other available technique for readily delivering at least limited amounts of electronic information to the telephony terminal 14.

Once the pointer to the requested information is received by the telephony terminal 14, the telephony terminal 14 can, automatically or in response to user input, access the requested information from the access server 20 using the pointer (step 116). Depending on whether the information is simply accessed via a browser or like application or a request to download the information is made, the access server 20 will allow the telephony terminal 14 to either view or download the requested information (step 118). As such, the telephony terminal 14 can readily download larger quantities of information in varying formats using readily available information access techniques, such as web browsing, file transfer techniques, streaming media, and the like. Although not illustrated, various authentication and security measures may be taken, wherein the telephony terminal 14 as well as the user may be required to provide user identification, passwords, and the like to access the requested information from the access server 20. In one embodiment, the requested information stored on the access server 20 will expire at a certain date or after a certain amount of time has elapsed after the information was requested, and upon expiration, the data is either removed from the server or the location can be used to store information associated with subsequent requests.

Figure 3:
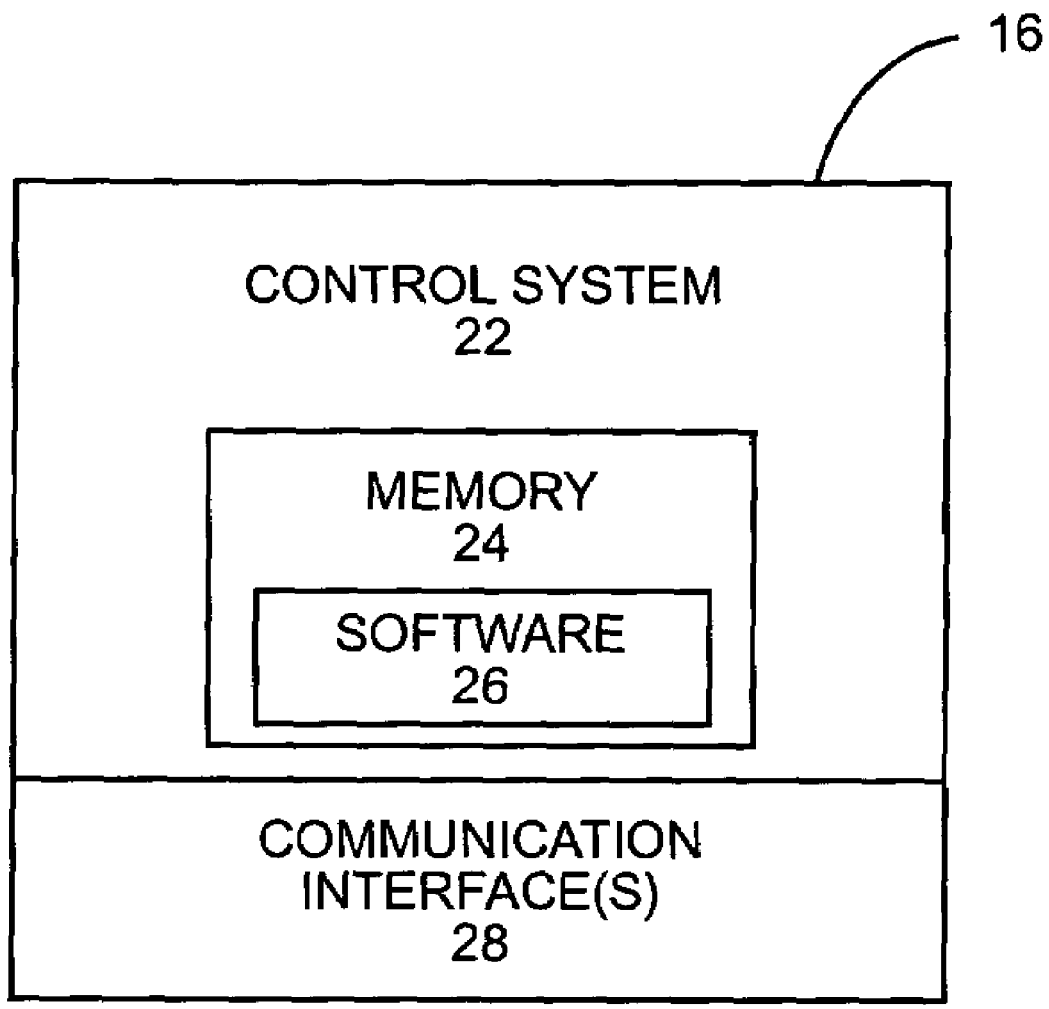
FIG. 3 is a block representation of an information services system according to one embodiment of the present invention.

A block representation of an information services system 16 is illustrated in FIG. 3. In general, the information services system 16 will have a control system 22 associated with sufficient memory 24 for the necessary software 26 to provide the above functionality. The control system 22 is also associated with one or more communication interfaces 28 to facilitate the termination of a call from the telephony terminal 14, interaction with the information database 18, access server 20, or other entity necessary for accessing, generating, or storing the requested information.

Figure 4:
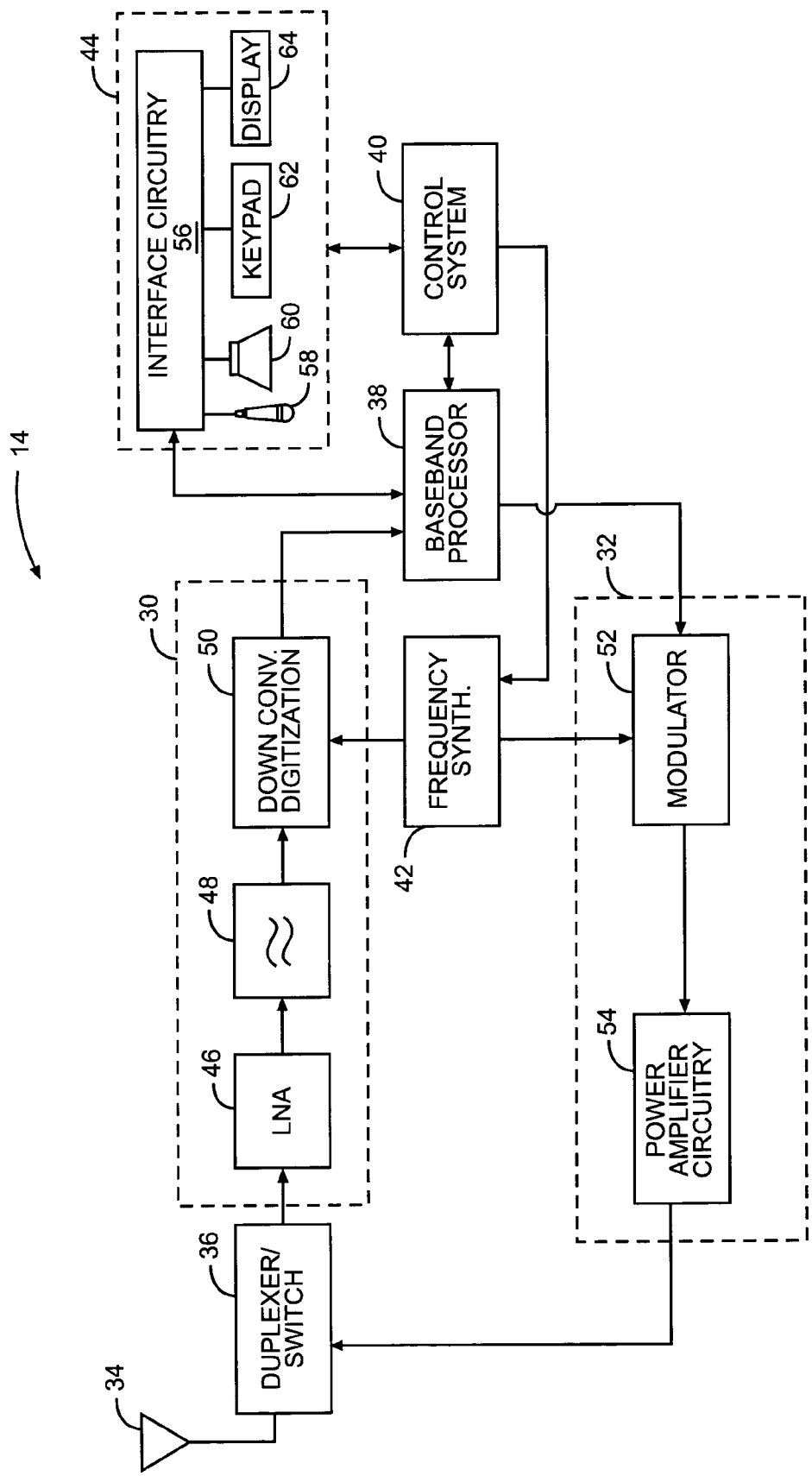
FIG. 4 is a block representation of a telephone terminal according to one embodiment of the present invention.

The basic architecture of the telephony terminal 14 configured for wireless communications is represented in FIG. 4 and may include a receiver front end 30, a radio frequency transmitter section 32, an antenna 34, a duplexer or switch 36, a baseband processor 38, a control system 40, a frequency synthesizer 42, and an interface 44. The receiver front end 30 receives information bearing radio frequency signals from one or more remote transmitters provided by a base station. A low noise amplifier 46 amplifies the signal. A filter circuit 48 minimizes broadband interference in the received signal, while downconversion and digitization circuitry 50 downconverts the filtered, received signal to an intermediate or baseband frequency signal, which is then digitized into one or more digital streams. The receiver front end 30 typically uses one or more mixing frequencies generated by the frequency synthesizer 42. The baseband processor 38 processes the digitized received signal to extract the information or data bits, including the pointer, conveyed in the received signals. This processing typically comprises demodulation, decoding, and error correction operations. As such, the baseband processor 38 is generally implemented in one or more digital signal processors (DSPs).

On the transmit side, the baseband processor 38 receives digitized data, which may represent voice, data, or control information, from the control system 40, which it encodes for transmission. The encoded data is output to the transmitter 32, where it is used by a modulator 52 to modulate a carrier signal that is at a desired transmit frequency. Power amplifier circuitry 54 amplifies the modulated carrier signal to a level appropriate for transmission, and delivers the amplified and modulated carrier signal to the antenna 34 through the duplexer or switch 36.

A user may interact with the telephony terminal 14 via the interface 44, which may include interface circuitry 56 associated with a microphone 58, a speaker 60, a keypad 62, and a display 64. The interface circuitry 56 typically includes analog-to-digital converters, digital-to-analog converters, amplifiers, and the like. Additionally, it may include a voice encoder/decoder, in which case it may communicate directly with the baseband processor 38. The microphone 58 will typically convert audio input, such as the user's voice, into an electrical signal, which is then digitized and passed directly or indirectly to the baseband processor 38. Audio information encoded in the received signal is recovered by the baseband processor 38, and converted by the interface circuitry 56 into an analog signal suitable for driving the speaker 60.

For the present invention, the control system 40 will store the pointer received in response to the information request and make the pointer available to applications running on the telephony terminal 14. From these applications, the requested information can be accessed automatically or upon receiving user input. Those skilled in the art will recognize improvements and modifications to the preferred embodiments of the present invention. All such improvements and modifications are considered within the scope of the concepts disclosed herein and the claims that follow.

What is claimed is:

1. A method for facilitating delivery of requested information to a user comprising:
   receiving a request for information from the user over a first network;
   sending to a telephony terminal a pointer, which identifies a location where requested information responsive to the request is located via the first network; and
   accessing the requested information in response to the request and storing the requested information at the location associated with the pointer,
   wherein the pointer is used by the telephony terminal to access the requested information via the first network.

2. The method of claim 1 comprising receiving a call from the user via the telephony terminal, and wherein the request is received via the call.

3. The method of claim 1 further comprising locating the requested information in response to the request and determining the pointer based on where the requested information is located.

4. The method of claim 1 further comprising creating the requested information in response to the request and storing the requested information at the location associated with the pointer.

5. The method of claim 1 wherein the requested information expires after a defined period of time and can be accessed by the telephony terminal only prior to expiration.

6. The method of claim 1 wherein the pointer is sent to the telephony terminal via a messaging service.

7. The method of claim 6 wherein the pointer is sent to the telephony terminal via a short messaging service message.

8. The method of claim 6 wherein the pointer is sent to the telephony terminal via an instant messaging message.

9. The method of claim 6 wherein the pointer is sent to the telephony terminal via an email message.

10. The method of claim 6 wherein the pointer is sent to the telephony terminal via a wireless application protocol message.

11. The method of claim 1 wherein the requested information is information available from operator services.

12. The method of claim 1 wherein the requested information is provided in at least one of the formats consisting of audio, video, graphics, text, and pictures.

13. The method of claim 1 wherein the requested information includes at least one of a group consisting of directory numbers, addresses, movie listings, driving directions, news, stock market information, order status, customer service information, sports scores, music, and video.

14. The method of claim 1 wherein the telephony terminal is a mobile terminal.

15. The method of claim 1 wherein the request is provided via voice or signal from the telephony terminal.

16. A system for facilitating delivery of requested information to a user comprising:
    at least one communication interface; and
    a control system associated with the at least one communication interface and adapted to:
    receive a request for information from the user over a first network;
    send to a telephony terminal a pointer, which identifies a location where the requested information responsive to the request is located via the first network; and
    access the requested information in response to the request and storing the requested information at the location associated with the pointer,
    wherein the pointer is used by the telephony terminal to access the requested information via the first network.

17. The system of claim 16 wherein the control system is further adapted to receive a call from the user via the telephony terminal, and wherein the request is received via the call.

18. The system of claim 16 wherein the control system is further adapted to locate the requested information in response to the request and determine the pointer based on where the requested information is located.

19. The system of claim 16 wherein the control system is further adapted to create the requested information in response to the request and store the requested information at the location associated with the pointer.

20. The system of claim 16 wherein the requested information expires after a defined period of time and can be accessed by the telephony terminal only prior to expiration.

21. The system of claim 16 wherein the pointer is sent to the telephony terminal via a messaging service.

22. The system of claim 21 wherein the pointer is sent to the telephony terminal via a short messaging service message.

23. The system of claim 21 wherein the pointer is sent to the telephony terminal via an instant messaging message.

24. The system of claim 21 wherein the pointer is sent to the telephony terminal via an email message.

25. The system of claim 21 wherein the pointer is sent to the telephony terminal via a wireless application protocol message.

26. The system of claim 16 wherein the requested information is information available from operator services.

27. The system of claim 16 wherein the requested information is provided in at least one of the formats consisting of audio, video, graphics, text, and pictures.

28. The system of claim 16 wherein the requested information includes at least one of a group consisting of directory numbers, addresses, movie listings, driving directions, news, stock market information, order status, customer service information, sports scores, music, and video.

29. The system of claim 16 wherein the telephony terminal is a mobile terminal.

30. The system of claim 16 wherein the request is provided via user voice or signal from the telephony terminal.

* * * * *